United States Patent [19]

Junkers

[11] Patent Number: 5,007,153

[45] Date of Patent: Apr. 16, 1991

[54] METHOD FOR TIGHTENING THREADED CONNECTORS

[76] Inventor: John K. Junkers, 7 Arrowhead La., Saddle River, N.J. 07458

[21] Appl. No.: 374,915

[22] Filed: Jun. 29, 1989

[51] Int. Cl.⁵ .............................................. B23Q 17/20

[52] U.S. Cl. .................................... 29/407; 73/862.25

[58] Field of Search .......................... 29/407, 709, 720; 73/761, 862.08, 862.21, 862.23, 862.24, 862.25

[56] References Cited

U.S. PATENT DOCUMENTS

| | | | |
|---|---|---|---|
| 3,851,386 | 12/1974 | Ellzey, Jr. | 73/761 X |
| 3,962,910 | 6/1976 | Spyridakis et al. | 73/761 |
| 3,969,810 | 7/1976 | Pagano | 73/761 X |
| 4,016,938 | 4/1977 | Rice | 73/761 X |
| 4,558,599 | 12/1985 | Sachs | 73/761 |
| 4,823,616 | 4/1989 | Tambini | 73/862.25 X |

*Primary Examiner*—Joseph M. Gorski
*Assistant Examiner*—Peter Dungba Vo
*Attorney, Agent, or Firm*—Michael J. Striker

[57] ABSTRACT

During tightening a threaded connector including for example a bolt and a nut a moment is first determined when a bolt starts to elongate, and thereafter the nut is turned only over such an angular distance with which a desired elongation of the bolt below its yield point is reached.

7 Claims, 1 Drawing Sheet

METHOD FOR TIGHTENING THREADED CONNECTORS

BACKGROUND OF THE INVENTION

The present invention relates to a method of and device for tightening threaded connectors by tightening tools.

It is known to tighten and loosen threaded connectors, for example bolts by respective bolting tools. The main object of tightening down bolts by bolting tools is to elongate a bolt when turning a nut on a flange to be assembled. The elongation of the bolt provides for a clamping force which holds the flange together. There are several approaches to provide the clamping force. One approach is to use hydraulic torque tools, another approach is to use tensioning tools that elongate the bolts hydraulically, and a further approach is to use turn-of-the nut method. The most common method is to elongate a bolt with the use of controlled torque. Due to the influence of friction between the threads and the surface of the nut and bolt, this method gives pure clamp load accuracy but not bolt elongation. As for tensioning tools which pull and thus elongate the bolts, here the bolt elongation is achieved but it remains inaccurate due to the tendency of the bolt to relax when the tensioner is taken off. The turn-of-the nut method would be ideal if the right staring point from where the bolt elongates could be established accurately. The term "turn-of-the nut" is used here to identify a method in accordance with which a nut is turned on the bolt to clamp the flange together In the known methods of tightening the threaded connectors based on the turn-of-the nut principle, it has not been possible to provide an exactly desired elongation of the bolt to achieve an exactly desired clamping force. Thus, while this method possesses significant advantages, it could not be implemented efficiently due to the above specified reasons.

SUMMARY OF THE INVENTION

Accordingly, it is an object of the present invention to provide a method of and a device for tightening threaded connectors, which avoids the above mentioned disadvantages.

In keeping with these objects and with others which will become apparent hereinafter, one feature of the present invention resides, briefly stated, in a method of tightening a threaded connector in accordance with which during turning a nut on a bolt, a moment is determined when an elongation of the bolt starts, and after the determination of this moment the nut is turned so as to produce a desired elongation of the bolt below its yield point.

It is another feature of the present invention to provide a device for tightening a threaded connector which has a tool for turning a nut on the bolt, and means for determining a moment when an elongation of the bolt starts, so that after the determination of said moment the tool turns the nut to produce a desired elongation of the bolt below its yield point.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
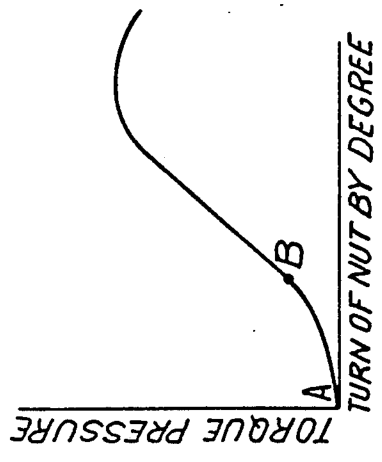
FIG. 1 is a view showing a characteristic line of a process of turning a nut on a bolt and illustrating a relationship between a torque/pressure and a turn of a nut by degrees.

The present invention deals with tightening a threaded connector by means of turning a nut 1 on a bolt 2. The nut 1 and the bolt 2 are used for assembling a flange 3 including for example two flange parts and a washer therebetween.

A tool, for example a wrench 4 engages the nut 1 to turn it on the bolt 2. The tool can be of any known construction which is used in practice. For example, the tool can be a fluid-operated wrench which receives a working fluid through a supply line 5, so that the working fluid displaces the piston with a piston rod, which in turn turns a pawl engaging with a ratchet provided with a central opening for engaging the nut 1.

As can be seen from FIG. 1, it has been determined that during turning a nut on a bolt, the characteristic line representing a relationship between a torque/pressure applied to the nut and a rotation of the nut has an initial curved portion and a following straight portion. The initial curved portion starting from point A and finishing at point B reflects the settling of the flanges, its bolts, as well as gaskets, etc. Once these parts are settled, the actual elongation of the bolt starts. This relationship has been established in the research described in "Design and Performance of an Automatic Control System for Fastener Tightening", published in the publication of the Institution of Mechanical Engineers, Proceeding 1977, Volume 191 38/77. In the above publication it was proposed to tighten the threaded connectors beyond the yield point of the bolt.

In accordance with the present invention, the relationship between the torque/pressure applied to the nut and the degrees of rotation of the nut is continuously monitored. The first parameter is monitored for example by a pressure sensor 6 connected with the supply line 5 which supplies the working fluid to the tool 4. The degree of rotation of the nut is monitored by a motion detector 7 for example by monitoring the position of the mark 8 provided for example on the ratchet of the tool 4. The signals from the elements 6 and 4 are supplied to a processing device 7 which processes the received actual values and for example can be displayed on an indicating device 9 which will show on its screen the characteristic line corresponding to the characteristic line in FIG. 1. When the characteristic line reaches the point B, an operator turns the nut over a predetermined angular distance or predetermined number of degrees of rotation, and stops the turning of the nut when a desired bolt elongation is achieved. The elongation can be established by knowing the number of threads per inch on the bolt. As most bolts used in the industry have 8 threads per inch, each full turn of a nut is equivalent to a bolt elongation of 125/1000 of an inch. Therefore, it can be initially predetermined how many degrees of rotation of the nut are necessary to achieve the desired elongation.

On the other hand, the turning of the nut can be stopped automatically at the moment of reaching the desired elongation of the bolt. In this case the processing device 7 can be connected with a valve and programmed so that when the relationship between the torque/pressure and the degree of rotation of the nut reaches the point B, a valve 10 arranged in the supply line 5 which supplies the working fluid to the tool 4 closes the supply line.

It is an important inventive feature that the rotation of the nut stops when a desired bolt elongation is reached, wherein the bolt elongation is always below the yield point of the bolt. Going beyond the yield point of the bolt involves an irreversible elongation which is highly undesirable in this field.

When the method is performed and the device is designed in accordance with the present invention, an exactly desired bolt elongation is achieved for reliable tightening of the threaded connector, and at the same time the risk of exceeding the yield point of a bolt is eliminated.

It should be emphasized that the processing device 7 can be adjustable for a variety of bolt threads per inch to allow its use for a great number of threaded connectors.

It will be understood that each of the elements described above, or two or more together, may also find a useful application in other types of constructions differing from the types described above.

While the invention has been illustrated and described as embodied in a method of and a device for tightening threaded connectors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A method of tightening a threaded connector including a bolt and a nut, comprising the steps of turning a nut on a bolt; continuously monitoring a relationship between a pressure applied for turning the nut and an angular distance of the turning of the nut; based on said monitored relationship between the pressure applied for the turning of the nut and the angular distance of the turning of the nut, determining a position of the nut when an elongation of the bolt starts; and thereafter turning the nut only over such an additional angular distance from the determined position, that a desired elongation of the bolt located below a yield point of the bolt is achieved.

2. The method as defined in claim 1, wherein said monitoring includes monitoring the pressure by detecting a pressure of a working fluid supplied to a tool which turns the nut on the bolt.

3. The method as defined in claim 1, wherein said monitoring includes detecting a motion of the nut during its turning on the bolt.

4. The method as defined in claim 3, wherein said detecting the motion of the nut includes detecting a motion of a nut-holding part of a tool which turns the nut.

5. The method as defined in claim 1; and further comprising displaying the relationship between the pressure and the angular distance on a display so that an operator can determine the point when the elongation of the bolt starts on the display and then turn the nut by the additional angular distance.

6. The method as defined in claim 1; and further comprising the step of automatically turning off a tool which turns the nut on the bolt upon reaching the desired elongation of the bolt.

7. The method as defined in claim 6, wherein said automatically turning off includes interrupting a supply of working medium to the tool which turns the nut on the bolt.

* * * * *

UNITED STATES PATENT AND TRADEMARK OFFICE

CERTIFICATE OF CORRECTION

PATENT NO. : 5,007,153

DATED : Apr. 16, 1991

INVENTOR(S) : John K. Junkers

It is certified that error appears in the above-identified patent and that said Letters Patent is hereby corrected as shown below:

The title page, showing the illustrative figure, should be deleted to appear as per attached title page.

Figure 2:
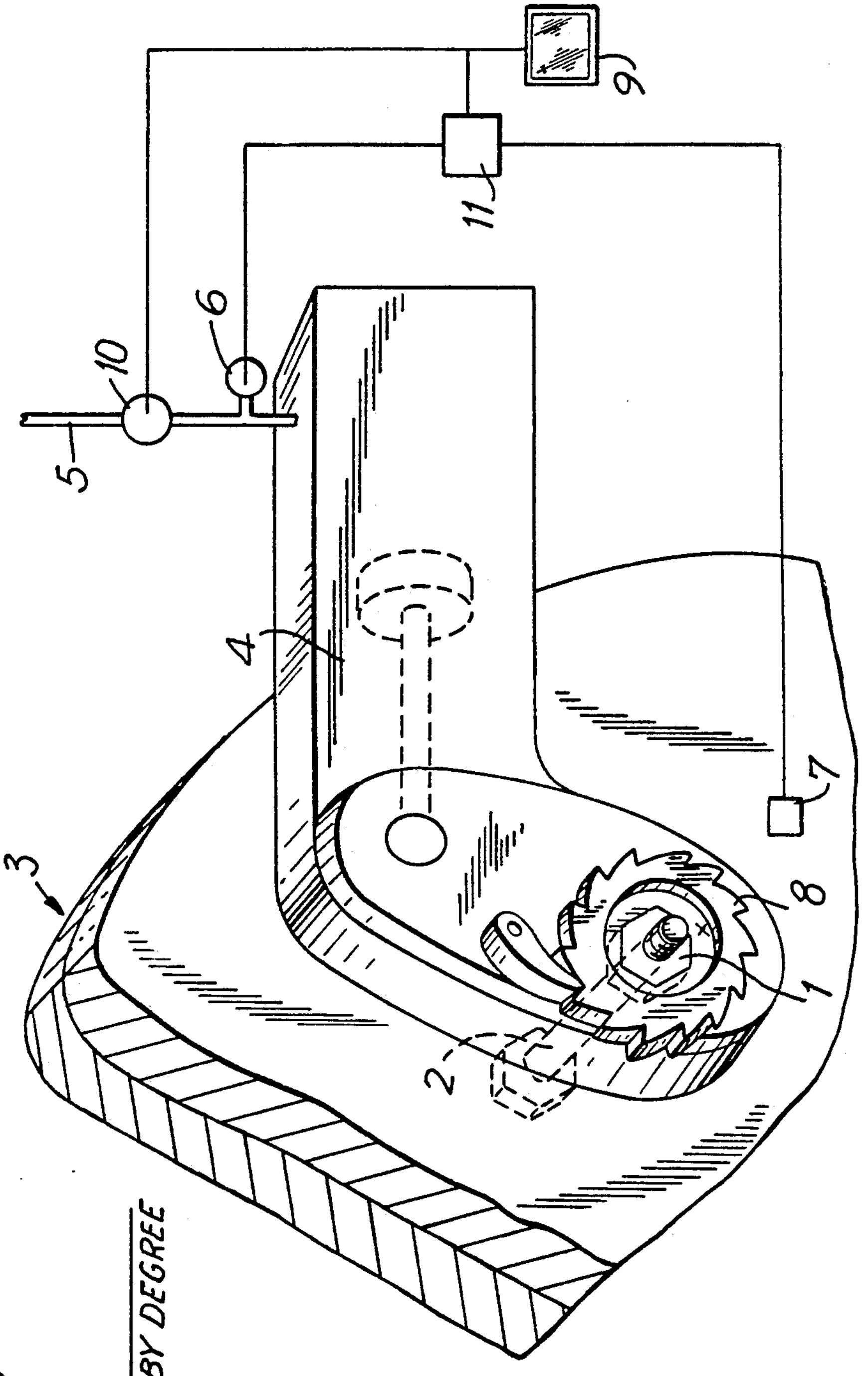
FIG. 2 is a view showing a device for tightening a threaded connector in accordance with the present invention.
Figure 2:
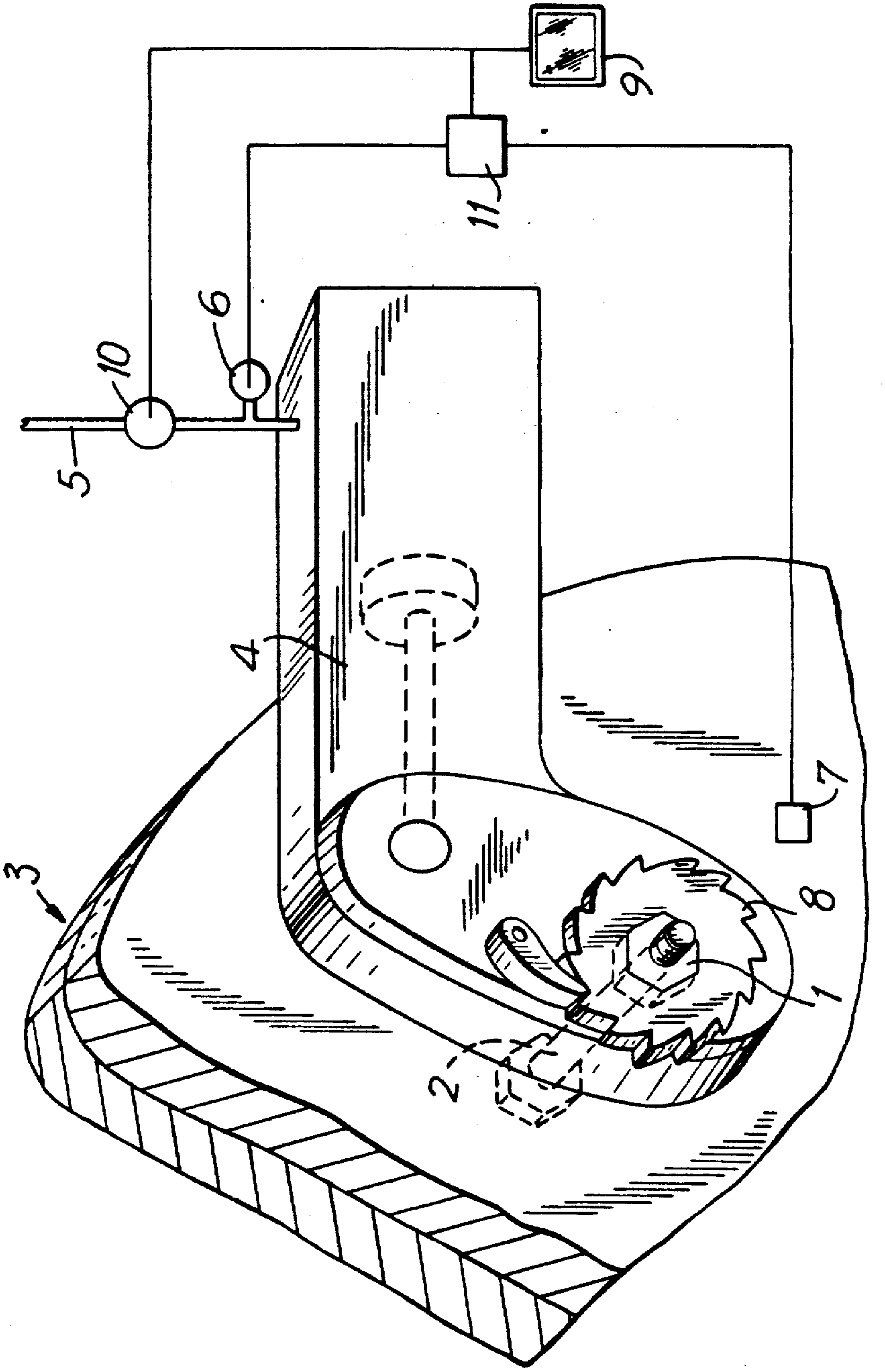

Figure 2 should be deleted to be replaced with Figure 2 as shown on the attached page.

Signed and Sealed this

Sixth Day of October, 1992

*Attest:*

DOUGLAS B. COMER

*Attesting Officer* *Acting Commissioner of Patents and Trademarks*

United States Patent [19] | [11] Patent Number: 5,007,153
Junkers | [45] Date of Patent: Apr. 16, 1991

[54] METHOD FOR TIGHTENING THREADED CONNECTORS

[76] Inventor: John K. Junkers, 7 Arrowhead La., Saddle River, N.J. 07458

[21] Appl. No.: 374,915

[22] Filed: Jun. 29, 1989

[51] Int. Cl.[5] .......... B23Q 17/20
[52] U.S. Cl. .......... 29/407; 73/862.25
[58] Field of Search .......... 29/407, 709, 720; 73/761, 862.08, 862.21, 862.23, 862.24, 862.25

[56] References Cited

U.S. PATENT DOCUMENTS 3,851,386 12/1974 Ellzey, Jr. .......... 73/761 X
3,962,910 6/1976 Spyridakis et al. .......... 73/761
3,969,810 7/1976 Pagano .......... 73/761 X
4,016,938 4/1977 Rice .......... 73/761 X
4,558,599 12/1985 Sachs .......... 73/761
4,823,616 4/1989 Tambini .......... 73/862.25 X

*Primary Examiner*—Joseph M. Gorski
*Assistant Examiner*—Peter Dungba Vo
*Attorney, Agent, or Firm*—Michael J. Striker

[57] ABSTRACT

During tightening a threaded connector including for example a bolt and a nut a moment is first determined when a bolt starts to elongate, and thereafter the nut is turned only over such an angular distance with which a desired elongation of the bolt below its yield point is reached.

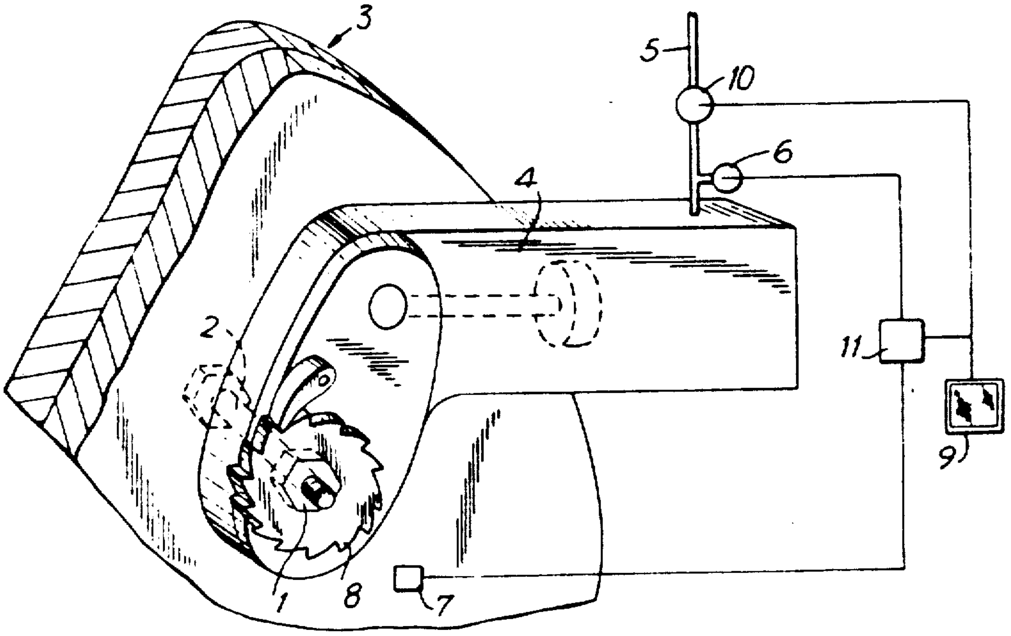

7 Claims, 1 Drawing Sheet